(12) United States Patent
Hossain

(10) Patent No.: US 7,257,310 B2
(45) Date of Patent: Aug. 14, 2007

(54) METHOD AND APPARATUS FOR PROCESSING DIGITAL IMAGES FILES TO A DIGITAL VIDEO DISC

(76) Inventor: Afzal Hossain, 1540 Oyama Dr., San Jose, CA (US) 95131

( * ) Notice: Subject to any disclaimer, the term of this patent is extended or adjusted under 35 U.S.C. 154(b) by 1006 days.

(21) Appl. No.: 10/394,004

(22) Filed: Mar. 24, 2003

(65) Prior Publication Data

US 2004/0252964 A1    Dec. 16, 2004

(51) Int. Cl.
*H04N 5/91* (2006.01)
(52) U.S. Cl. .......................... 386/46; 386/125; 355/40
(58) Field of Classification Search ................. 386/21, 386/32, 38, 46, 95, 125, 126; 348/222.1, 348/231.1, 231.6, 231.8, 231.9; 355/27, 355/40, 41, 77
See application file for complete search history.

(56) References Cited

U.S. PATENT DOCUMENTS

| | | | |
|---|---|---|---|
| 5,153,730 A * | 10/1992 | Nagasaki et al. | 386/44 |
| 6,094,521 A * | 7/2000 | Okayama et al. | 386/44 |
| 6,438,638 B1 * | 8/2002 | Jones et al. | 710/301 |
| 7,015,959 B1 * | 3/2006 | Morita | 348/231.8 |
| 7,180,551 B2 * | 2/2007 | Katayama et al. | 386/35 |

* cited by examiner

*Primary Examiner*—James J. Groody
*Assistant Examiner*—Christopher Onuaku
(74) *Attorney, Agent, or Firm*—David Giglio

(57) ABSTRACT

There is provided a method and apparatus for transferring digital image files to a digital video disc. The files in the digital video disc, or digital photos, are representative of a plurality of still pictures and are user controllable interactively played on either a personal computer or through a standard digital video disc playback device, such as a digital video disc player or a video compact disc player. The user has control of manipulating and sequencing the digital photos. During playback, the user has control of sequence during playback on either the personal computer or the television. A custom software package allows for the user controlled playback of the digital photos with most standard playback devices.

41 Claims, 21 Drawing Sheets

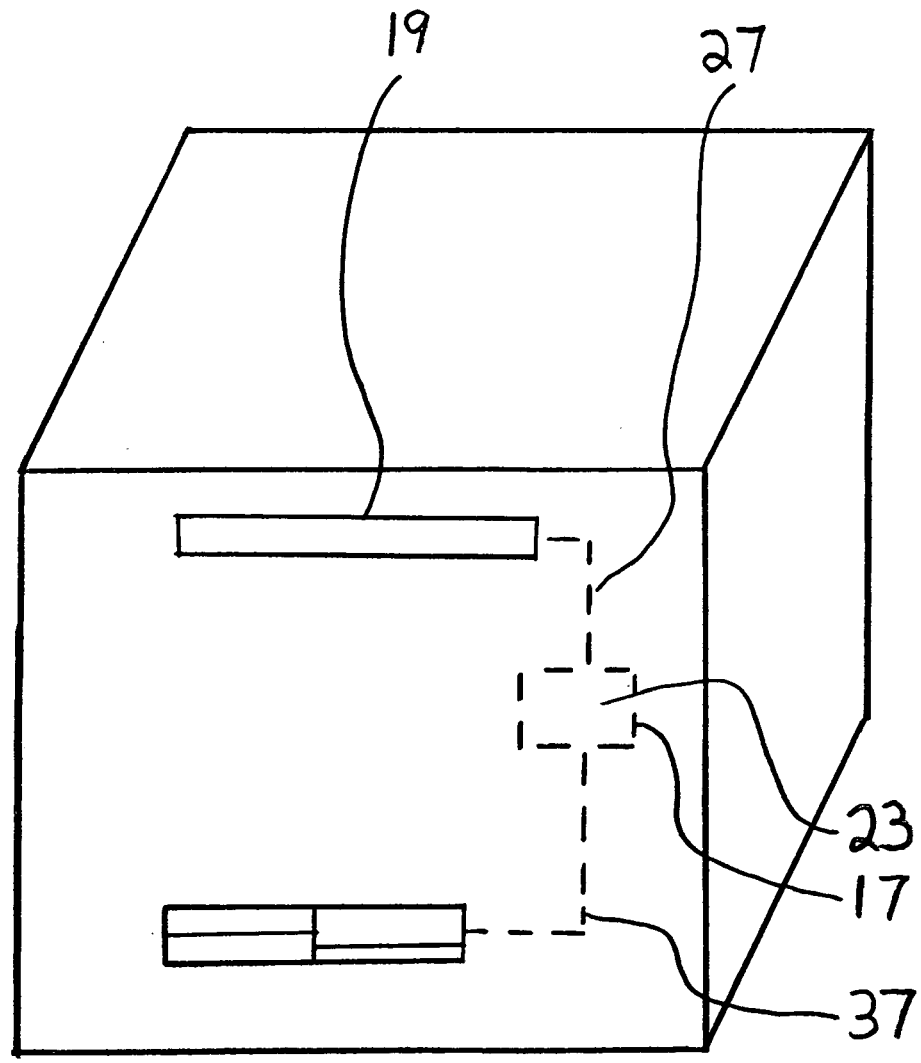
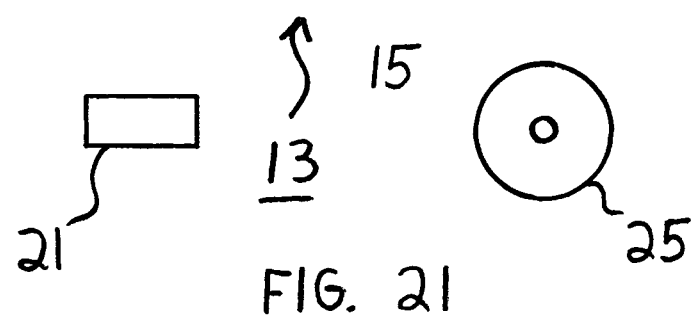
FIG. 21

METHOD AND APPARATUS FOR PROCESSING DIGITAL IMAGES FILES TO A DIGITAL VIDEO DISC

This application is related to pending applications by the same inventor, Ser. No. 09/961,893 that was filed on or about Sep. 24, 2001, and Ser. No. 10/307,543 that was filed on Dec. 2, 2002, both of which are hereby incorporated by reference.

FIELD OF THE INVENTION

The present invention relates to the field of still pictures and, more particularly to a method and apparatus for transferring still picture digital image files to a digital video disc.

BACKGROUND OF THE INVENTION

It is known to digitally scan still pictures into digital image files that can be stored into memory. It is also known to create digital image files using a digital camera, wherein the digital image files are stored on a memory card. Other types of storing digital image files is also known. It is also known to process these stored image files and transfer the processed files to a second storage medium. Many companies offer transfer of stored image files to a compact disc. The compact disc is later interfaced with a personal computer so that the images can be viewed, manipulated and even e-mailed.

It is also known to process these stored image files to a compact disc so that the stored image files can be interfaced with a special purpose digital video disc player for viewing with a television. However, there are many limitations to these methods and discs. First, these discs inevitably require the user to purchase a preselected digital video disc player. The discs will not operate with most standard digital video players.

Another drawback is that the user has no control over the playback of the images. The images will not stay on the television indefinitely nor is there a universal method of controlling forward and reverse when viewing a sequence of images. Generally, it is a hit and miss proposition to forward and reverse control the sequence of images.

Another problem with the present art is that the software is very restrictive and time consuming as pictures must be transposed one at a time. Further, these pictures are transferred into video and not a picture show presentation.

Yet still further, this software requires a lot of equipment and expertise as it is designed for a home user on a personal computer.

Still yet another drawback is that the images often do not use the entire picture space on the television screen. Therefore, the images are more difficult to view and enjoy.

SUMMARY AND OBJECTS OF THE PRESENT INVENTION

It is therefore an object of the present invention to improve the art of photography.

It is another object of the present invention to improve the art of viewing still pictures.

It is still yet another object of the present invention to improve the art of storing digital image files onto digital video discs.

It is a further object of the present invention to improve the art of digital image processing.

It is a feature of the present invention to provide an acknowledgment or advertising information on a digital video disc that will appear to a user during playback.

It is another feature of the present invention to provide a parallel processing system for simultaneously digitally processing image files to a plurality of digital video discs.

It is yet another feature of the present invention to provide a digital video disc that is easily interfaced with a standard digital video disc playback device.

It is still another feature of the present invention to provide a digital video disc that is easily interfaced with a standard digital video disc playback device and a personal computer.

It is still yet another feature of the present invention to provide a digital video disc that is compatible for playback with most standard digital video disc players, wherein the displayed images are user controllable for duration and sequence.

It is a further feature of the present invention to provide a digital video disc that is compatible for playback with most standard digital video disc players, wherein the displayed images utilize substantially the entire pixel space on the playback monitor.

These and other objects are provided in accordance with the present invention in which there is provided an apparatus for creating a digital video disc having user controllable interactive playback capabilities for still images when the digital video disc is played on a standard digital video disc playback device. The still images stored on the digital video disc are transposed from compressed digital image files that are stored on a memory card. In a first embodiment, the entire apparatus is self contained in one housing. The apparatus includes a digital video disc writer, a multi card reader and customized computer software program that reads the compressed digital image files and formats the same according to a digital video storage standard.

The software program also formats the stored digital image data files to a personal computer format and to a digital video standard format.

The computer software system also includes writing files for writing the formatted digital image files to the digital video disc. Operational files install first operational data onto the digital video disc, such that the first operational data is user controllably interactive with a personal computer operating system. The operational files also install second operational data onto the digital video disc, such that the second operational data is user controllably interactive with a standard digital video disc player operating system.

The computer software system further includes a grouping method for grouping the digital image files into at least one subgroup. A manipulation method included in the computer software system allows the user to manipulate and alter any of the digital image files. A sequencing method allows for storing the digital image files in a chosen sequence. A selection method allows the user to choose at least one digital video standard.

A display shows the status of the conversion. Typically, the digital video disc is either a digital video disc (DVD), a compact disc or a hard disc in a digital videocassette recorder playback device. However, it is foreseeable that newer yet to be marketed types of storage medium can also work.

The customized computer software program also includes files having a grouping method for grouping the digital image files into at least one subgroup, a display method for displaying thumbnail images of a subgroup onto a computer monitor, a selection method for selecting digital image files of at least one thumbnail image from the selected subgroup, second display method for displaying a full image representative of the selected digital image files, a manipulation method for manipulating the displayed full image, and a copying method for copying digital image files from a group of digital image files.

Further, the customized computer software program includes files having a grouping method for grouping the image files into at least one subgroup, a selection method for selecting one of the subgroups, a display method for displaying a first image onto the video standard display, and a control method for controlling the playback, timing and sequence of the displayed images.

Preselected video streamer files allows the digital video disc to contain files that are representative of moving advertisement, acknowledgment or another moving scene.

In another embodiment, an apparatus for creating a digital video disc having user controllable interactive playback capabilities for still images when the digital video disc is played on a standard digital video disc playback device is defined by a digital video disc writer in a first housing. An external source includes compressed digital image files.

The external source is a first storage medium which can include memory and a digital scanner capable of digitally scanning at least one still photograph. The first storage medium can also be a memory card from a digital camera. The first storage medium is not to be limited by any examples set forth herein, but should extend to all those known to one skilled in the art.

The first housing also includes the customized computer software program as previously described.

In yet another embodiment, the customized computer software program and digital video disc writer are stored in separate housings. The compressed digital image files are input through a source input, which can include a multi card reader, a digital scanner interface or other known inputs.

In a photo processing system, a roll of film is processed to produce a number of still photographs. Each photograph is digitally scanned to produce compressed digital image files, which are then processed to the digital video storage standard by the customized computer software program as described herein. A digital video disc is then produced in accordance with the present invention so that a customer has both still photographs and a digital video disc.

A multiple processing system for processing and transferring digital image files from a plurality of first storage mediums to a plurality of digital video discs is also provided. The multiple processing system includes parallel computer processing capability which generally comprises a plurality of computer processing units for processing a plurality of digital image files, a plurality of digital image inputs for inputting the plurality of digital image files, and a plurality of digital media writers for transferring the processed digital image files onto the plurality of digital video discs. A first parallel interface delivers the digital image file inputs from the digital image inputs to the parallel computer processors. A second parallel interface delivers the processed image files to the plurality of digital media writers.

BRIEF DESCRIPTION OF THE DRAWINGS

The above and other objects of the present invention will be better understood by reading the following detailed description of the preferred embodiments of the invention, when considered in connection with the accompanying drawings, in which:

FIG. 21 is a perspective view of a preferred embodiment of the present invention.

DETAILED DESCRIPTION OF THE PRESENT INVENTION

Figure 1:
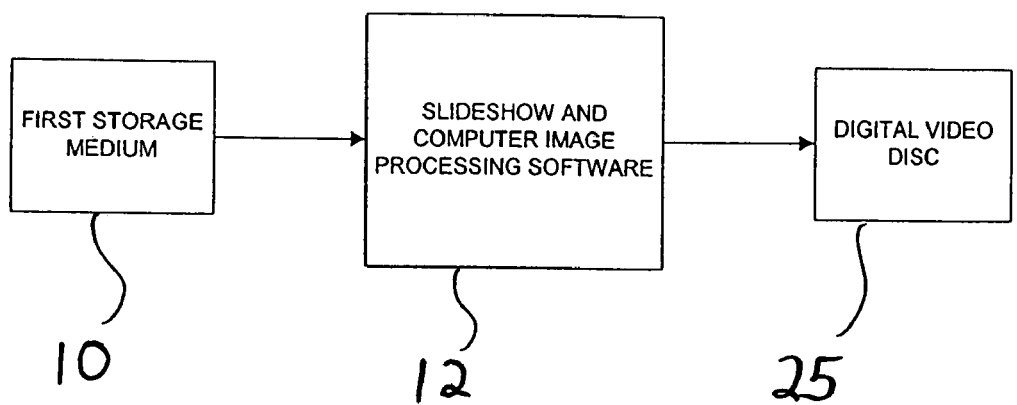
FIG. 1 is a block diagram in accordance with a preferred embodiment of the present invention.

Referring now to FIG. 1, there is shown a block diagram in accordance with a preferred embodiment of the present invention. A first storage medium 10 contains digital image data in the form of image files, usually being representative of a plurality of still pictures. Typically, the first storage medium 10 includes a memory card from a digital camera or scanned digital images of analog photos of film. Another type of first storage. medium 10 includes a hard disk from an analog film scanner or even a hard disk in a digital video cassette recorder.

In most digital cameras this memory card is conveniently removed and interfaced: with a personal computer for viewing still photos on a personal computer monitor. The memory card is easily reinstalled into the camera for further use. Memory cards and digital cameras are well known to one skilled in the art. It is known in the art for the personal computer to read, store, display and even e-mail image files.

Figure 2:
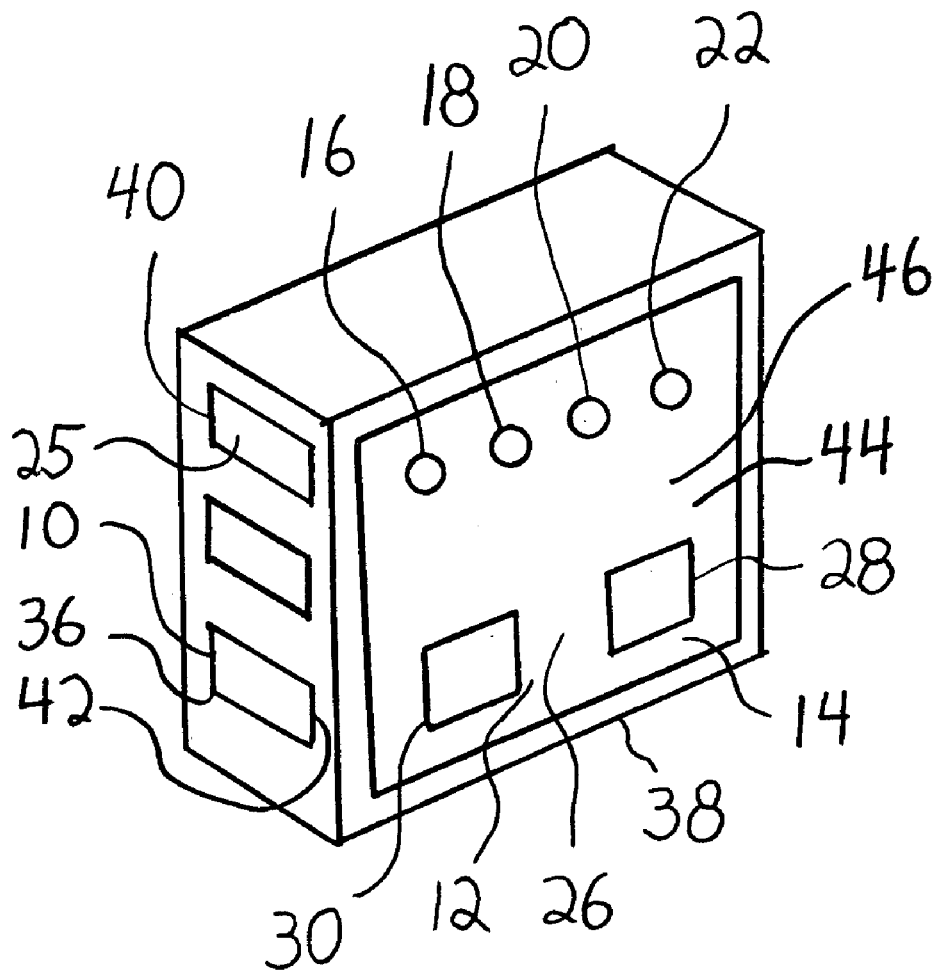
FIG. 2 is a perspective view of the preferred embodiment as shown in FIG. 1.

As shown in FIG. 1, the first storage medium 10 is interfaced with a computer software system 12. A display 14 which is linked to the computer software system 12, depicted in FIG. 2, includes an idle signal 16 which informs a user that the computer software system 12 is in an idle or standby mode. The display 14 and computer software system 12 can also be housed in separate units shown in FIG. 3.

A ready signal 18 alerts a user that the computer software system 12 is ready to proceed with a requested task. A busy signal 20 tells a user that the computer software system 12 is busy performing another task. Finally, a burning disk 22 signal confirms that the computer software system 12 is writing software to a digital video disc 25. Within the context of this invention, the term digital video disc 25 also includes the term video compact disc ("VCD").

Figure 18:
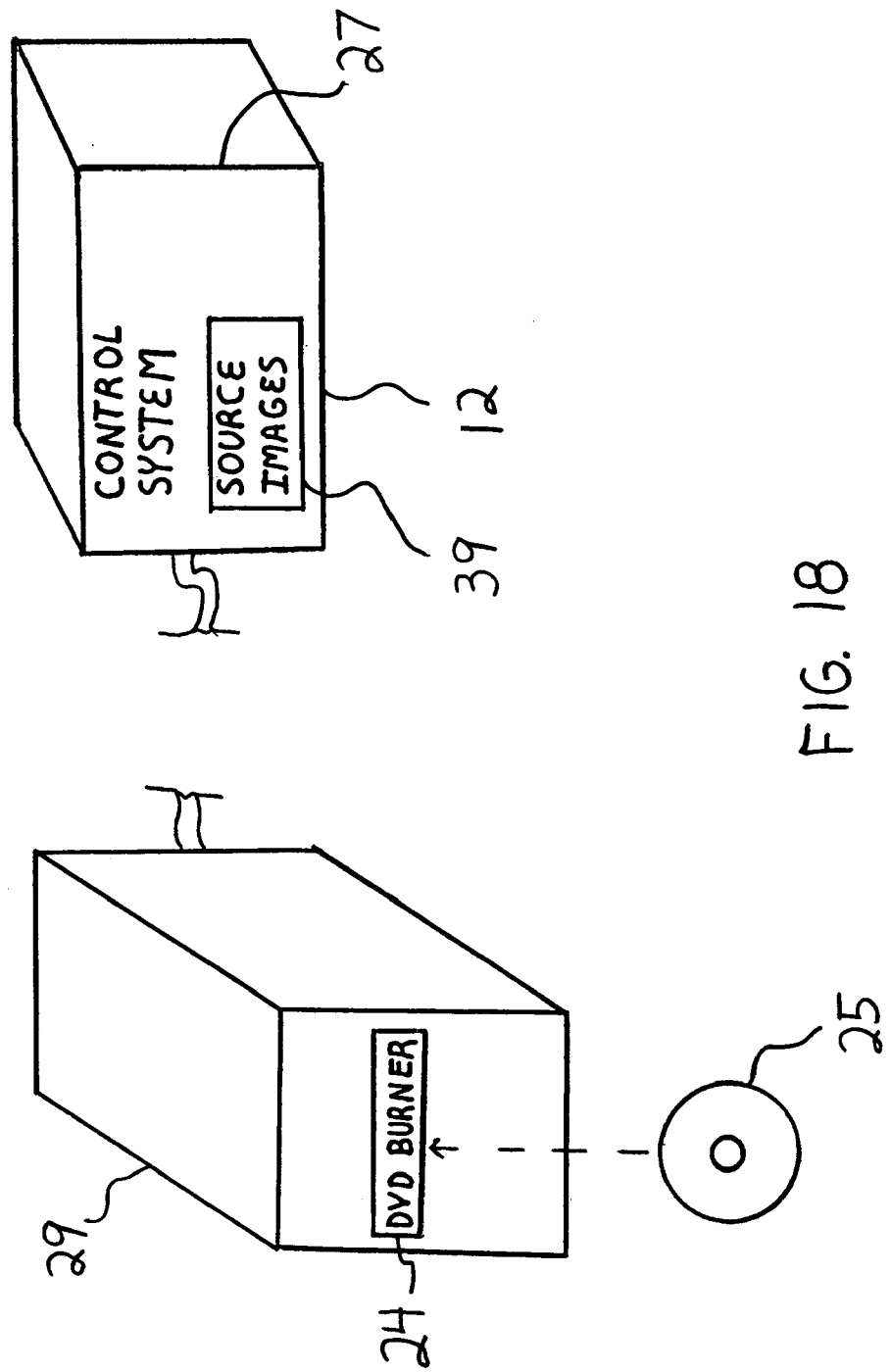
FIG. 18 is a perspective view of a preferred embodiment of the present invention wherein there is no monitor to accompany conversion.

It is possible to automate all the processing steps from formatting digital image files that are stored on the first storage medium 10 to creating the digital video disc 25, which is depicted by example in FIG. 18. The computer software system 12 having a control system 27 and a customized computer processing software program 23 reads image files that are presented to a source interface 39. Typically, the source interface 39 includes capabilities of accepting one or more of a memory card, a hard disk from an analog scanner, a hard disk from a digital video cassette recorder, a compact disc, a separate digital video disc, or other known digital image files storage media.

Next, the computer processing software program 23 formats the image files to a digital video storage standard as described herein. The formatted image files are transmitted to a remote or external digital video disk writer 29, via known wired or wireless technology. The digital video disk writer 29 writes the formatted image files to the digital video disc 25.

Looking at a variation of the system in FIG. 18, FIG. 21 shows a self contained processing system 13 having a multi card input 15, a control system 17 and a digital video disc writer 19.

A memory card 21 is interfaced with the multi card input 15. The memory card 21 contains compressed image files representative of still images. The control system 17 automatically detects the compressed image files and the customized computer software program 23 formats the compressed image files to a digital video storage standard. The digital video disc writer 19 transfers this formatted data to a digital video disc 25. This entire process is performed automatically by the processing system 13 of FIG. 21.

The memory card 21 is inserted into the multi card input 15. The control system 17 contains a customized computer processing software program 23 that automatically reads the compressed image files from the memory card 21.

The compressed image files are transmitted to the control system 17 via an internal bus 37 or through internal wireless technology. After formatting the compressed image files according to a digital video storage standard, the formatted data is sent to the digital video disc writer 19 via the internal bus 37. The digital video disc writer 19 now writes the formatted image files to the digital video disc 25.

Using known means the computer software program 23 also formats the compressed image files to a personal computer software format which are also written to the digital video disc 25.

Figure 19:
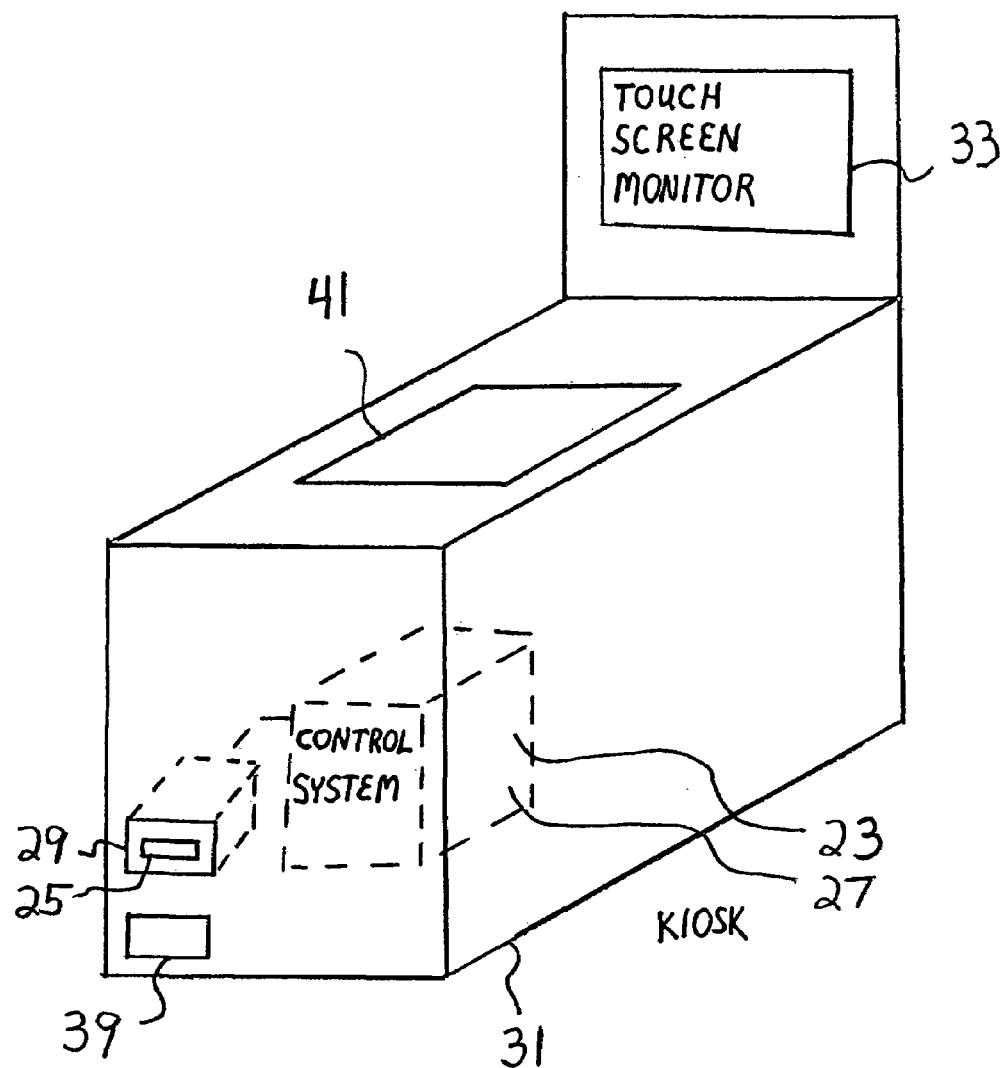
FIG. 19 is a perspective view of another preferred embodiment of the present invention, wherein the present invention is designed inside of a kiosk.

Looking at FIG. 19 and another embodiment, the control system 27, customized computer software program 23 and digital video disc writer 29 are embedded in a kiosk 31. The kiosk 31 includes the source interface 39 which allows the user to interface compressed digital image files from the first storage medium 10 to the computer software system 12. A kiosk touch screen monitor 33 gives the user the option of automatic or interactive control of formatting the files to the digital video disc 25.

As described herein, the customized computer software program 23 formats the compressed image files to a digital video storage standard and transmits the same to the digital video disc writer 29, wherein the same are embedded onto a digital video disc 25.

The kiosk 31, optionally, further includes a digital scanner 41, which allows a user to produce compressed digital image files representative of the user's still pictures. These compressed digital image files are processed and embedded to the digital video disc 25 as just described. The digital image files are transferred between the internal elements of the kiosk 31 using known data transmission technology.

Figure 20:
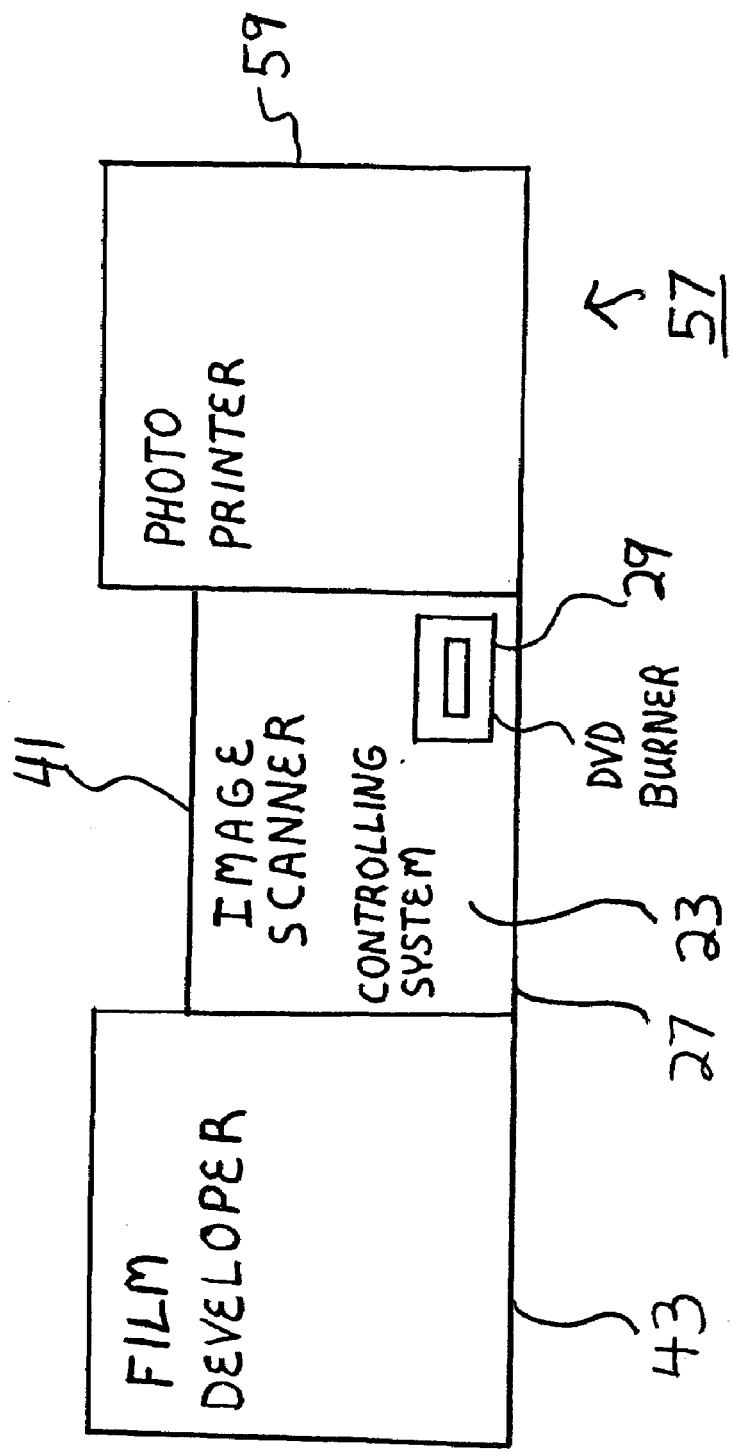
FIG. 20 is a block diagram of a preferred embodiment wherein the present invention is designed inside of a photo finishing system.

In still another application, and referring to FIG. 20, the control system 27, the customized computer software program 23 and digital video disc writer 29 are embedded in a photo finishing system 57. The user brings a roll of film to be developed by the film developer 43. A photo printer 59 produces photographs representative of the developed film. These photographs are presented to the digital scanner 41 either manually or automatically. The digital scanner 41 produces compressed digital image files representative of images disposed on the developed film.

Again, the control system 27 and the customized computer software program 23 reads the compressed digital image files, formats the same according to a digital video storage standard, and then transmits the formatted digital image files to the digital video disc writer 29 wherein they are embedded onto the digital video disc 25.

Therefore, the user now has a user controllable interactive digital video disc 25 containing files representative of the desired images and actual photography of the same images. This can all be performed in one self contained unit or in a combination of units.

Figure 17:
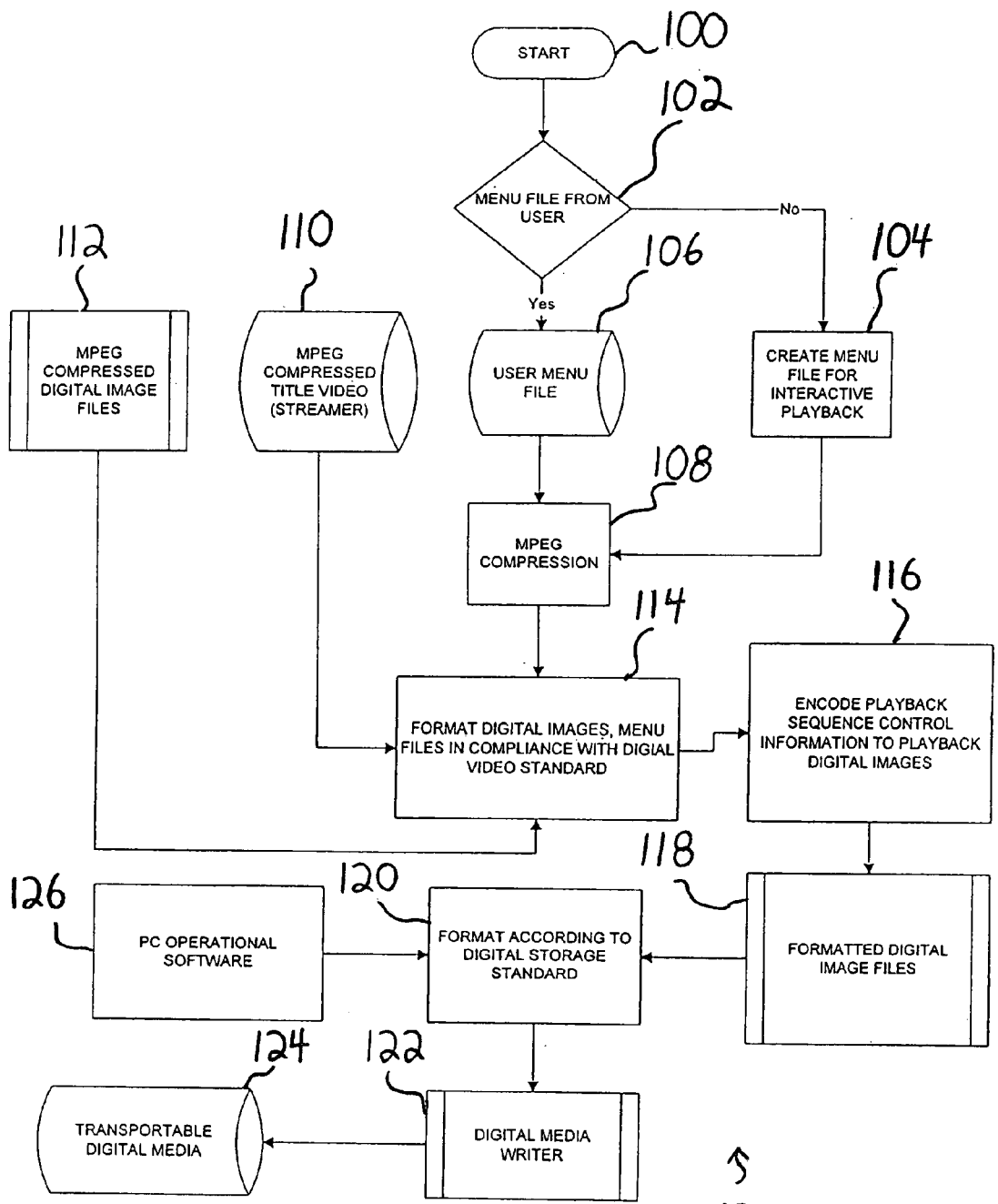
FIG. 17 is a block diagram showing slideshow and computer image processing software system of FIG. 1.

Referring now to FIG. 17, the computer system 12, which includes the control system 27 and the customized computer software program 23, functions step wise to create a digital video disc 25 in accordance with the present invention. The computer system 12 automatically determines whether the user needs a menu file, step 102. If required, the computer system 12 creates a menu file for user controllable interactive playback, step 104. Otherwise, the user menu file is utilized, step 106. Next, the computer system 12 proceeds to MPEG compression to compress the menu files, step 108. The MPEG compressed menu file (step 108), the MPEG compressed title video files (step 110) and the MPEG compressed digital image files (step 112) are formatted to digital video standard (step 114).

The computer system 12 encodes playback sequence control information for playback of digital images, step 116. PC operational software is directly installed to the digital video disc 25 (step 126). Next, the computer system 12 formats the digital image files according to a digital video storage standard, steps 118 and 120. Now, the digital media writer writes the formatted digital image files to the digital video disc, steps 122 and 124.

Figure 3:
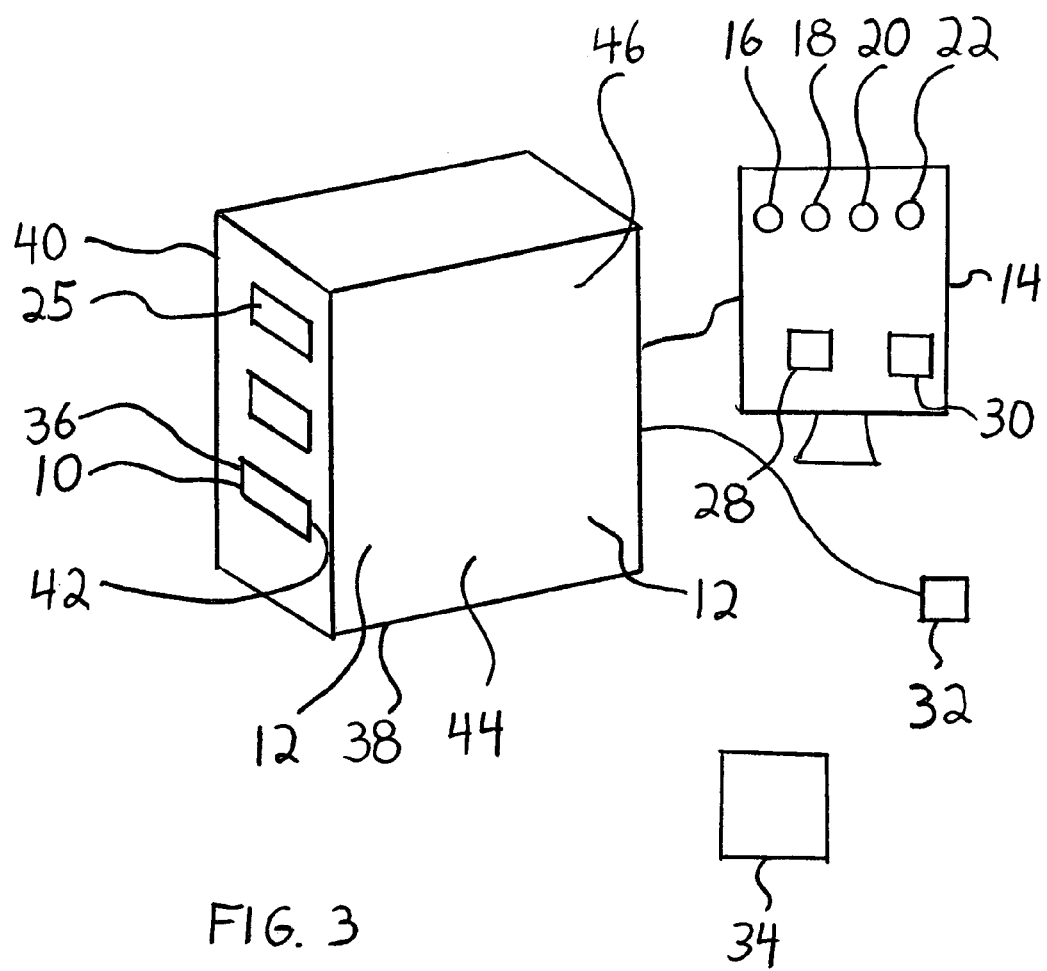
FIG. 3 is a perspective view of an alternate preferred embodiment as shown in FIG. 1.

Referring to FIG. 3, the display 14 includes a user controllable interactive touch screen monitor 26 having a create input 28 and a cancel input 30. Once the create input 28 is selected, the interactive touch screen 26 may include additional inputs which allows the user to sequence and group the image files or the computer software system 12 may completely process the image files with no further input from the user. As shown in FIG. 3, a mouse 32 and keypad 34 can also be used to sequence, group and even manipulate image files. Other user interface buttons and status signals are also possible.

In use, a user interfaces the first storage medium 10 with the computer software system 12, typically by inserting the first storage medium 10 into a multi-format memory reader slot 36 that is disposed in a central processing unit housing 38. The user also interfaces the digital video disc 25 with the computer software system 12, typically by inserting the digital video disk 25 into a DVD slot 40 that is disposed in the CPU housing 38.

Digital scanning software 42 scans the digital image files that are on the first storage medium 10. The digital scanning software 42 successfully scans image files in different types of formats. For example, Conica, Kodak, Mitsubishi and many other digital image technology companies use different formats to store digital image files onto digital image memory cards. JPEG, GIFF, TIFF and BMP are industry standards or widely known formats.

After scanning the image files, personal computer formatting software 12 formats the image files to personal computer image format. The computer software system 12 includes a menu file that permits the user to group the formatted image files into any desired playback sequence. Grouping of digital images can also be performed automatically by the computer. Once the image files are finally grouped according to the users choice, these grouped image files formatted for personal computers are then transferred to the digital video disc 25 using a digital media writer 58. The digital media writer may be physically disposed internal or external to the CPU housing 38.

The scanned image digital data is also formatted to a digital video standard format that is recognized by a selected video standard. The computer software system 12 includes a memory 46 for storing the digital image files and software that includes subroutines containing various video standards. Some video standards include (Digital VHS, DVD-Video, DVD-Photo, DVD-Multi, DVD, Internet Streaming Media and compressed digital video standards such as MPEG-1, MPEG-2 and JPEG). The video standards for DVD (read only disc) may be found in the following documents available by license from a DVD Logo and Licensing Corporation (managed by Toshiba Corporation of Tokyo, Japan; DVD-ROM) (Part 1: Physical Specification, Part 2: File System Specification), DVD-Video (Part 3: Video Specifications), DVD-Audio (Part 4: Audio Specification); and the following contains the MPEG (Moving Picture Experts Group) Standard; MPEG-1 (System): Standard ISO/IEC 1172-1, MPEG-1 (Video): Standard ISO/IEC 11172-2, MPEG-1 (Audio): Standard ISO/IEC 11172-3, MPEG-2 (System): Standard ISO/IEC 13818-1, MPEG-2 (Video): Standard ISO/IEC 13818-1, MPEG-2 (Audio): Standard ISO/IEC 13818-3; AC-3 Standards: "Digital Audio Compression Standard," Advanced Television System Committee, Washington.

Digital video storage standards also includes video CD specification, Version 2.0, April 1995; also known as "WhiteBook" from Phillips "super video specification."

The computer software system 12 offers the user an option of selecting a video standard through the interactive touch screen 26 or it may be a preselected video standard, such as DVD. It should be apparent to one skilled in the art that other selection apparatus can also be employed, such as point and click using a mouse.

The computer software system 12 gives the user further options such as grouping, sequencing and manipulating the digital files for controlling the playback sequence. All of these functions can also be performed automatically by the computer.

The video standard formatted files are now grouped and transferred to the digital video disc 25 The digital video disc 25 now contains software and digital image files that are formatted for viewing, manipulating and sending via e-mail through a personal computer. The digital video disc 25 also contains software and digital image files that are formatted to allow the digital images to be played on a standard playback device using any known video standard.

Figure 4:
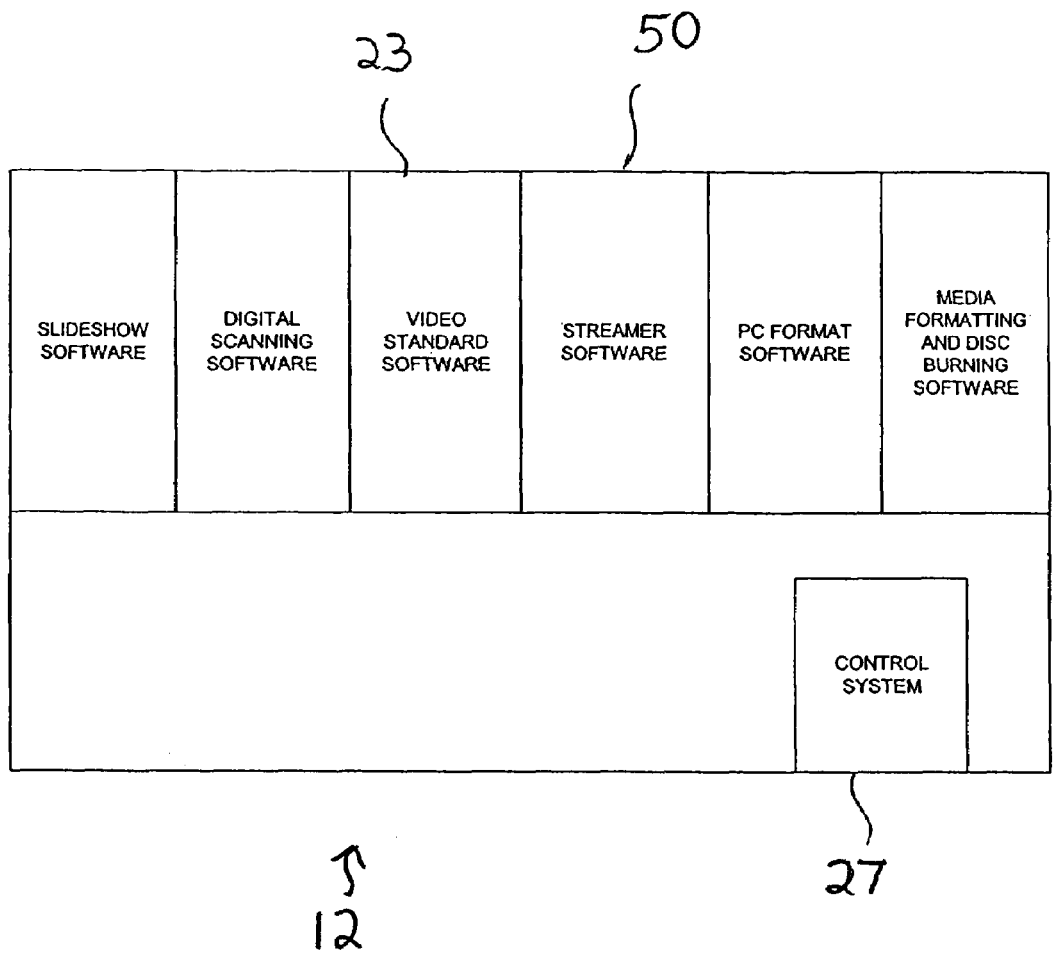
FIG. 4 is a block diagram depicting software feature of the present invention.

An additional feature of the computer software system 12 of the present invention includes a video streamer software program 50, shown in FIG. 4, that installs video streamer files to the digital video disc 25. Video streamer files are digital image files that are representative of a moving picture such as an advertisement display, an acknowledgment, a moving scene or other type of moving picture.

One benefit of the video streamer is that advertisement can be sold by the owner or assignee of the computer software system 12, such that the advertisement appears when a user begins accessing his files on the digital video disc 25.

Figure 5:
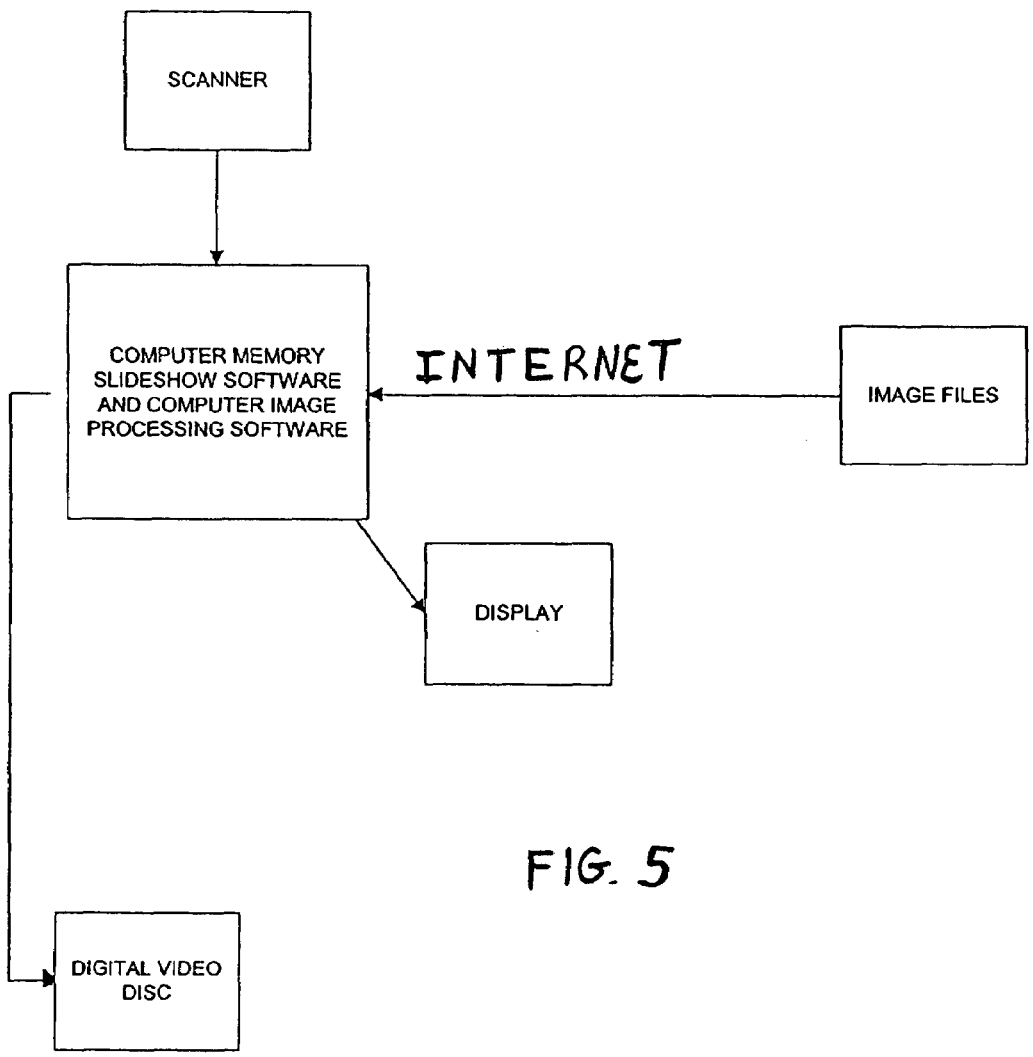
FIG. 5 is a block diagram of an alternative embodiment of the present invention.

In another embodiment of the present invention shown in FIG. 5, the image files are transferred electronically, for example via the Internet, or some other form of networked connection to a central computer 54. A browser program serves as a graphical interface and allows the user to view, sequence, group, format, manipulate and write the image files to the digital video disc 25 in both the personal computer and video formats as described above. The browser also allows the user to select and install one of a predetermined video streamers as also described above.

The computer software system 12 creates a menu file, if needed, for user controllable interactive playback of the images.

In playback mode, the user has the option of either interfacing the digital video disc 25 with a personal computer or with another playback device, such as a digital video disc player, that is interfaced with a display device, such as a television monitor.

When the user selects playback with a personal computer, the software on the digital video disc 25 includes operational and application files that allows the user many known personal computer related options and applications.

The computer monitor first displays the video streamer, that has been previously described, before displaying thumbnail sketches representative of a first batch of grouped images. From here the user selects one of the thumbnail sketches for manipulation, moves to a second batch of grouped images, or selects a slideshow option. If the user selects one of the thumbnail sketches, the selected sketch or image appears in a larger fashion on the computer monitor.

The user is now presented with a plethora of options for manipulating the selected image. These options are all known to one having skill in the art and some of these options include e-mailing the selected image, rotating the selected image, zooming in and out on the selected image and many other known options.

The user has the options of selecting for manipulation any of the thumbnail sketches at any time. When the user selects the slideshow presentation on his personal computer, the personal computer displays the images one at a time on the computer monitor. The displayed images use the entire pixel space on the display.

During slideshow presentation, the user has the option of moving forward or backward through the sequence of images or keeping the displayed image on the computer display. The displayed image does not change unless instructed to change by the user. The user has control of the slideshow playback sequence.

When the user chooses to interface the digital video disc 25 with a playback device such as a digital video disc player, that is interfaced with a standard television monitor the video streamer is displayed on the television. Following the video streamer, the slideshow presentation having the above described slideshow capabilities now appears on the television monitor. The user controls the playback sequence through the digital video disc player remote control.

Figure 6:
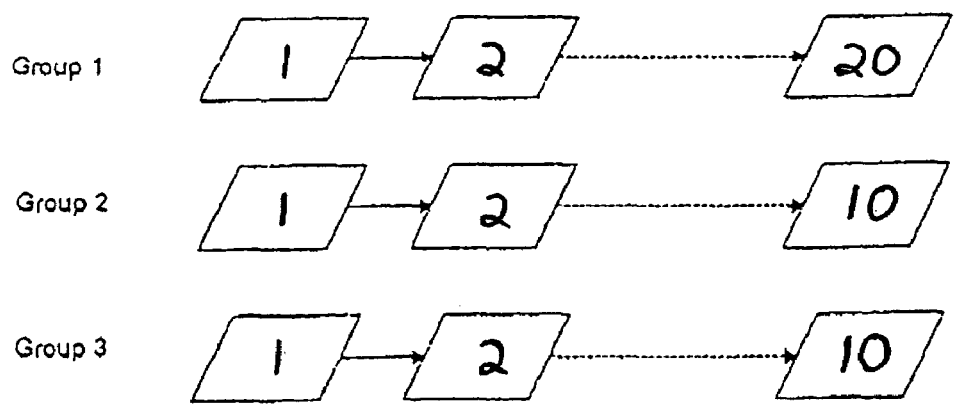
FIG. 6 is a block diagram of an example of a storage sequence in accordance with a preferred embodiment of the present invention.

Turning back to processing the digital files to the digital video disc 25, and with reference to one example of a playback control sequence of digital images as depicted in FIG. 6, sequences of digital files are selected and placed in groups one, two and three. Group one is illustrated as containing a total of twenty images, while groups two and three each contain ten images. The images are grouped in any desired manner.

Figure 7:
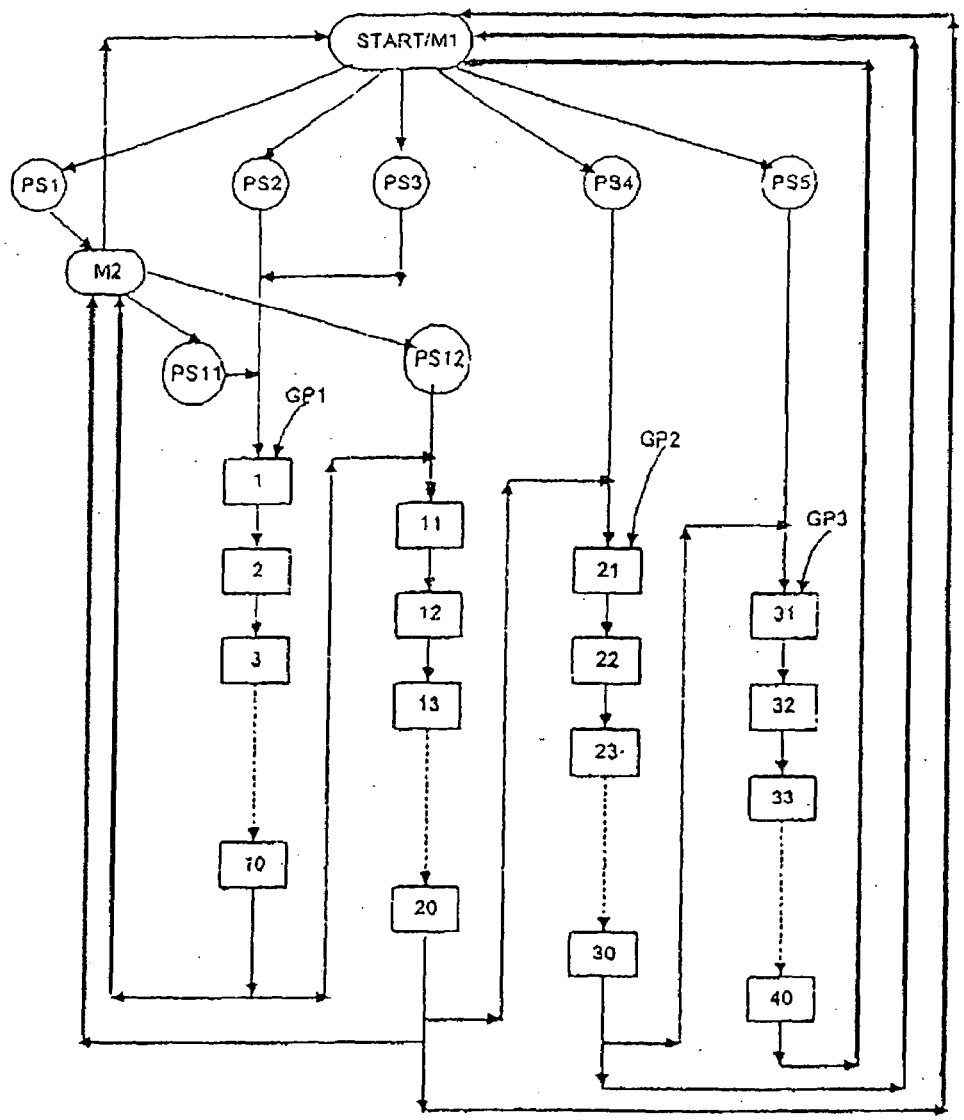
FIG. 7 is a block diagram of an example of a reproduction sequence in accordance with a preferred embodiment of the present invention.

With reference to the example depicted in FIG. 7, a desired reproduction sequence of the digital image files of groups one, two and three are illustrated. Start/M1 is a root menu file that contains selection points PS1, PS2, PS3, PS4 and PS5. The images in group 1 are further divided into two playback sequences. Menu image M2 represents selection points PS11 and PS12 of playback sequences of digital images in group one. Each playback sequence comprises a linear sequence of digital image files and a return path to the selection points. The menu selection points can also be buttons or thumbnails of target images.

Figure 8:
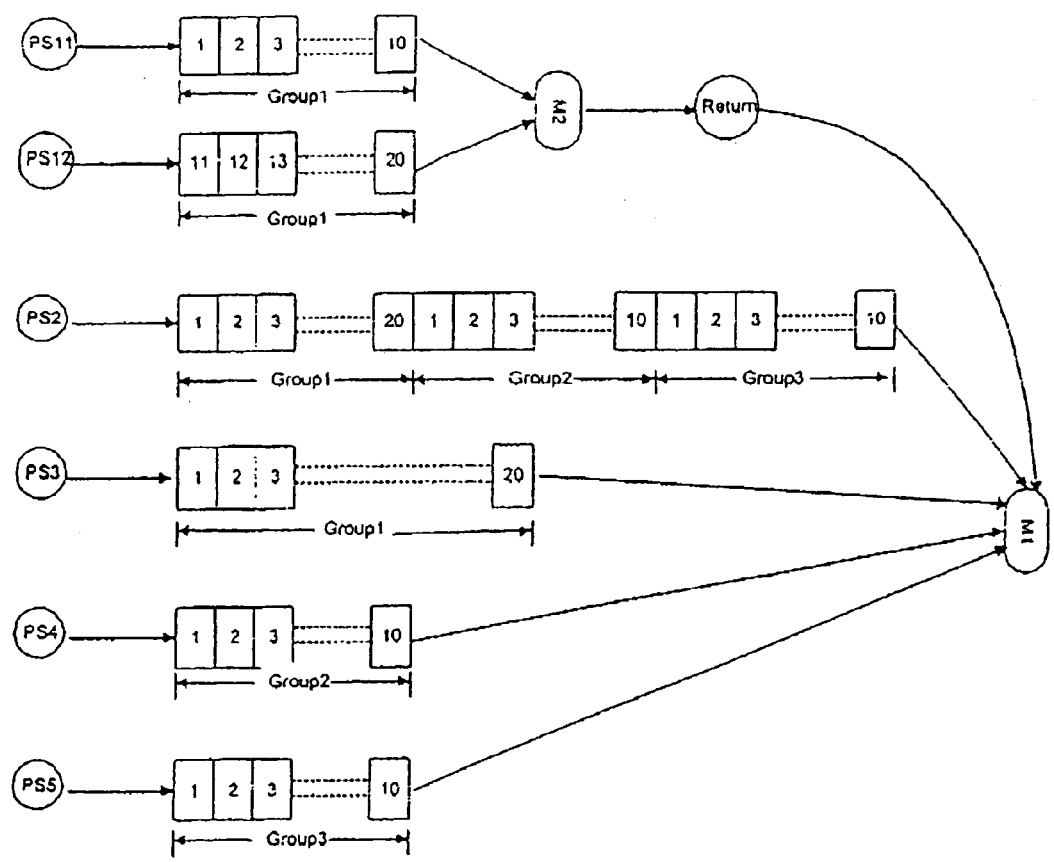
FIG. 8 is a block diagram of a playback sequence of the reproduction sequence of FIG. 7.
Figure 9A:
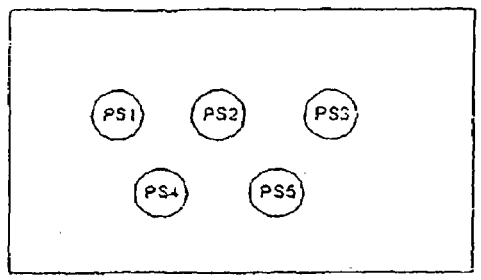
FIGS. 9a and b are block diagrams illustrating sample menu images that appear during playback.
Figure 9B:
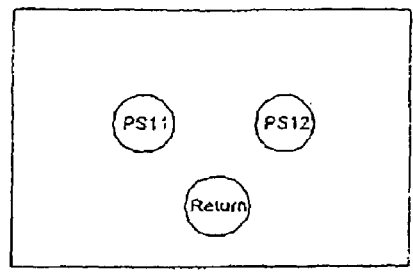
FIG. 9c is a block diagram showing a remote control unit in accordance with a preferred playback of the present invention.
Figure 9C:
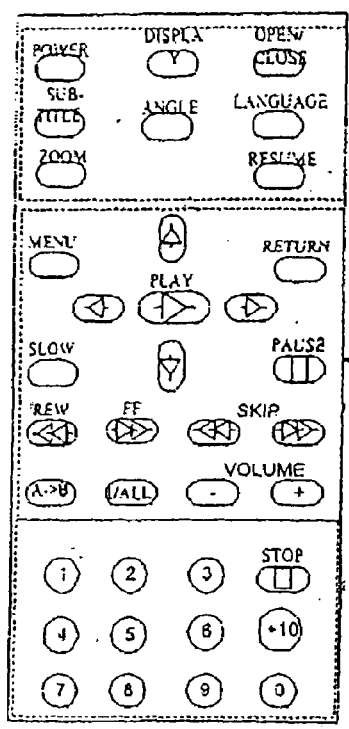

With reference to FIG. 8, all of the playback sequences of the digital image files shown in FIG. 7 are illustrated. FIGS. 9a and 9b illustrate example menu images that would appear on television and which contains the selection points of the playback sequences. A remote control unit 58, shown in FIG. 9c, is used to transmit commands to select selection points on the menu image. These menu images are stored on the digital video disc 25 along with the digital image files. The computer of the playback device creates the playback sequence in accordance with the video standard from the grouping of the digital image files.

Figure 10:
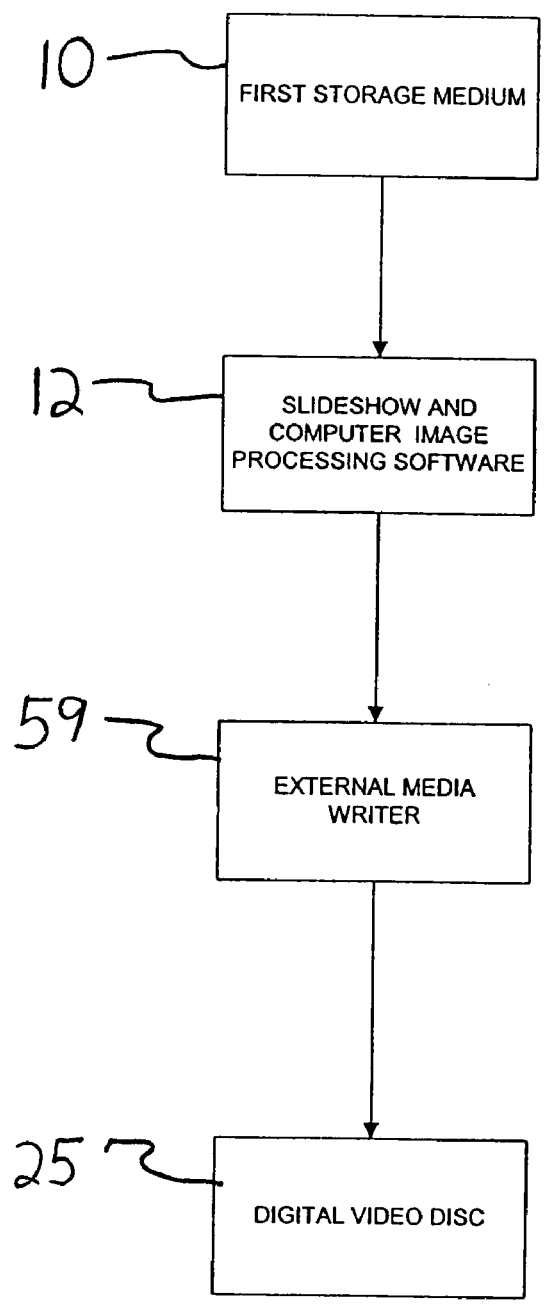
FIG. 10 is a block diagram in accordance with another alternative embodiment of the present invention.

With reference to FIG. 10, the same system as that shown in FIG. 1 is reproduced with the exception that the computer software system 12 does not include a media writer incorporated therein. Instead, the external media writer 59 is interconnected between the computer software system 12 and the digital video disc 25.

Figure 11:
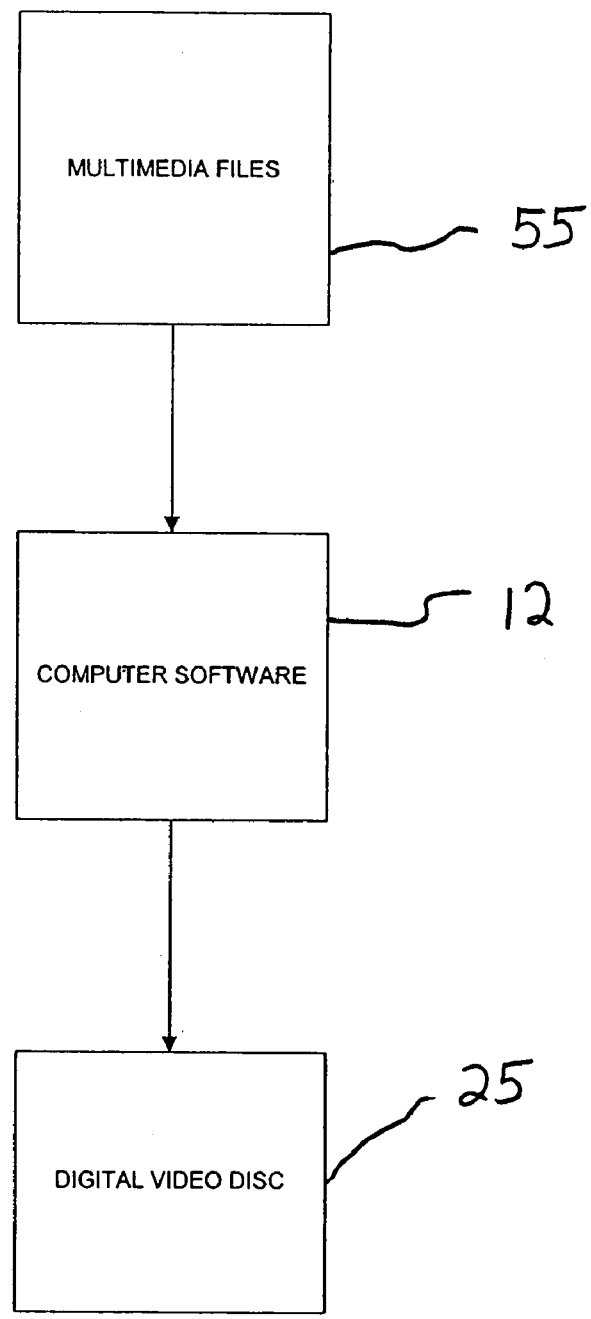
FIG. 11 is a block diagram in accordance with a further alternative embodiment of the present invention.
Figure 12:
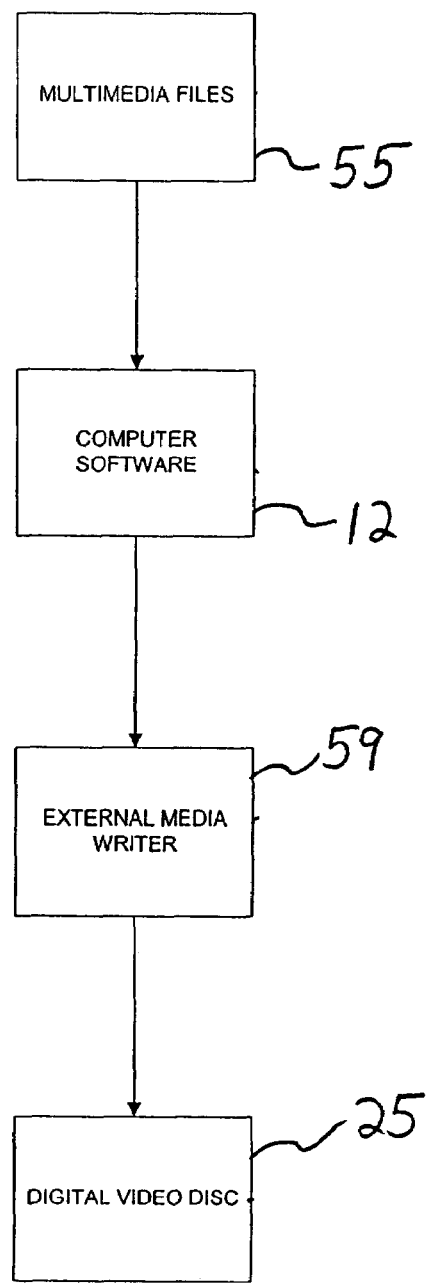
FIG. 12 is a block diagram in accordance with yet a further alternative embodiment of the present invention.

Before proceeding with a description of the embodiments illustrated in FIGS. 11 and 12, it is necessary to explain that the computer software system 12 is also capable of processing digital, audio and/or multimedia files 55 according to digital audio storage and playback standards. Audio standards include, for example, DVD-Audio, DVD-Multi, DVD, Internet Streaming Media standards, and compressed digital audio standards, such as AC-3, MPEG-1, MPEG-2 audio, MP3 etc. . . . Uncompressed digital audio files are also supported.

Referring to FIG. 11, the computer software system 12 receives multimedia files 54 from the user. In the same manner as the computer software system 12 processes digital image files, it processes multimedia files 55 and writes the formatted files to the digital video disc 25. The computer software system 12 processes one or any combination of digital multimedia files according to corresponding standards to create the digital video disc 25.

Referring to FIG. 12, an analog to the embodiment shown in FIG. 11 is shown. Specifically, the computer software system 12 does not include an internal media writer, but instead needs to interconnect to the external media writer 59.

Figure 14:
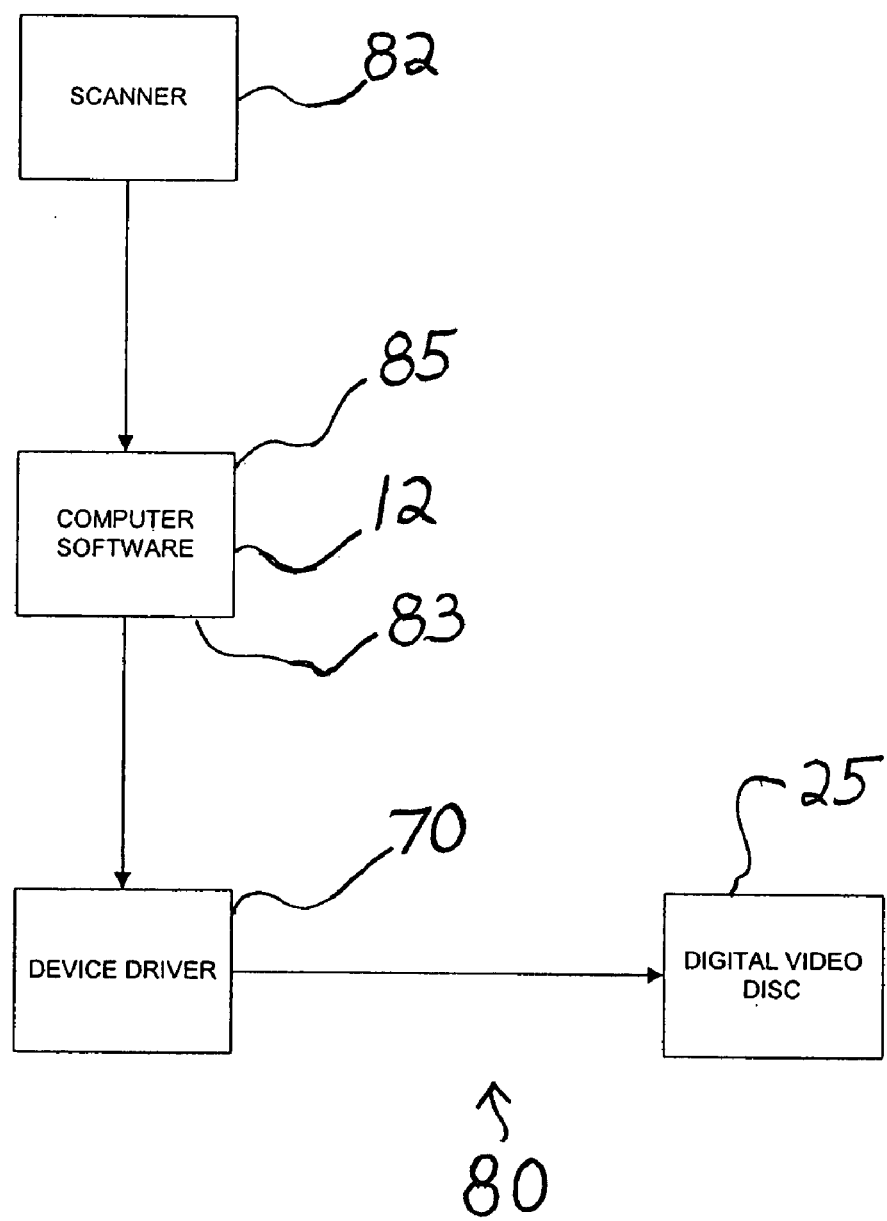
FIG. 14 is a block diagram in accordance with yet still another embodiment of the present invention.

The present invention will now be described according to some preferred applications. In one application depicted in FIG. 14, a user brings a number analog photos or a roll of film to an on-site unit 80. The roll of film must first be developed to produce the analog photos. A scanner 82 scans the analog photos and sends digital image data files representative of the images of the analog photos to a computer processing unit 83, having the computer software system 12, directly or via a scanning card. Memory 85 within the computer processing unit 83 stores the digital image data.

It should be noted that memory 85 is typically in the form of a hard disk and can be located anywhere in the application. Typically, it is common to locate the hard disk in either the scanner 82 or in the computer processing unit 83.

At this point, the user sequences and groups the image files as described above. The user has further options such as altering the digital image data files to remove red-eye, correcting other flaws or manipulating the images in other ways, such as rotating or zooming etc. Each of the functions can also be performed automatically by the computer. A media writer 70 now transfers the altered image files to the digital video disc 25 or a compact disc. The media writer 70 can be either internal or external. The user can now interface the digital video disc 25 with either a personal computer or other playback device, such as a digital video player.

Figure 15:
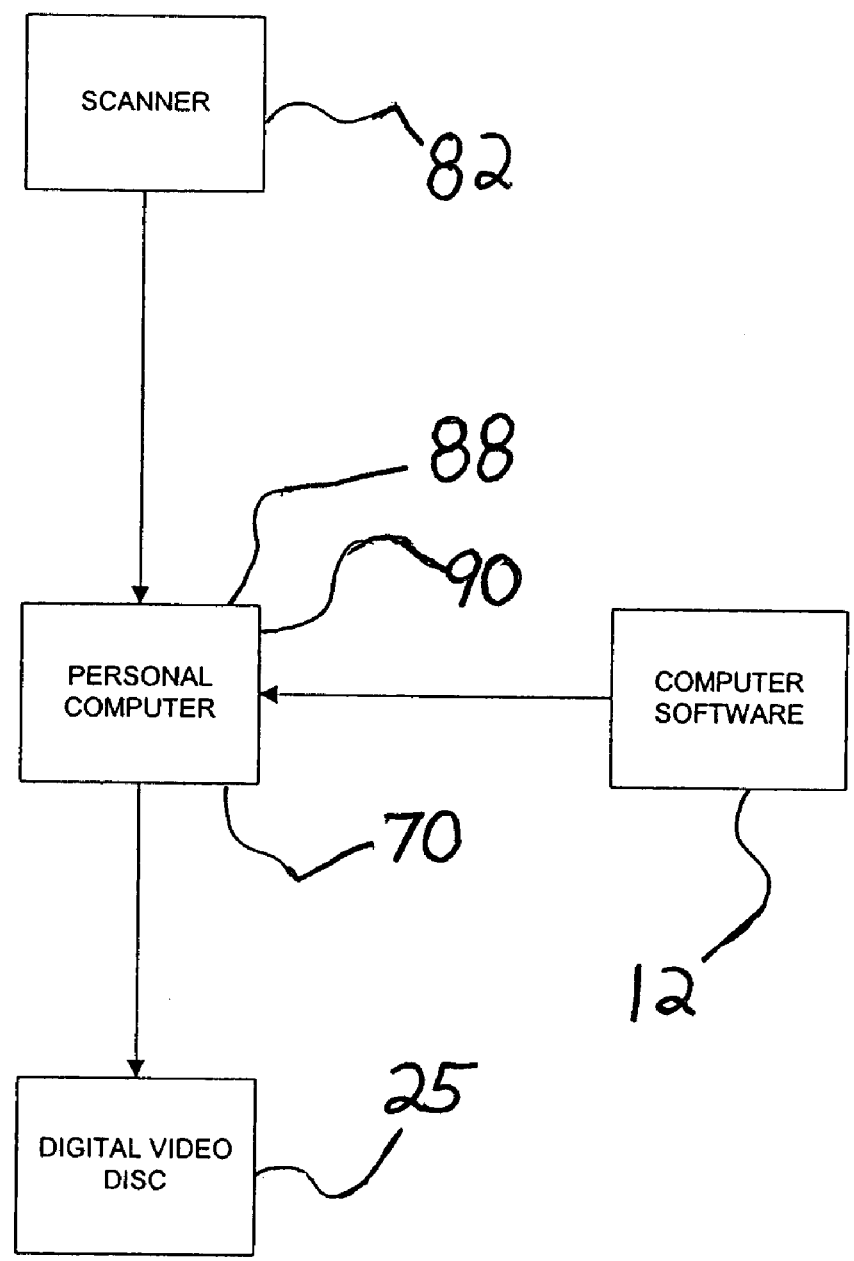
FIG. 15 is a block diagram in accordance with yet still a further embodiment of the present invention.
Figure 16:
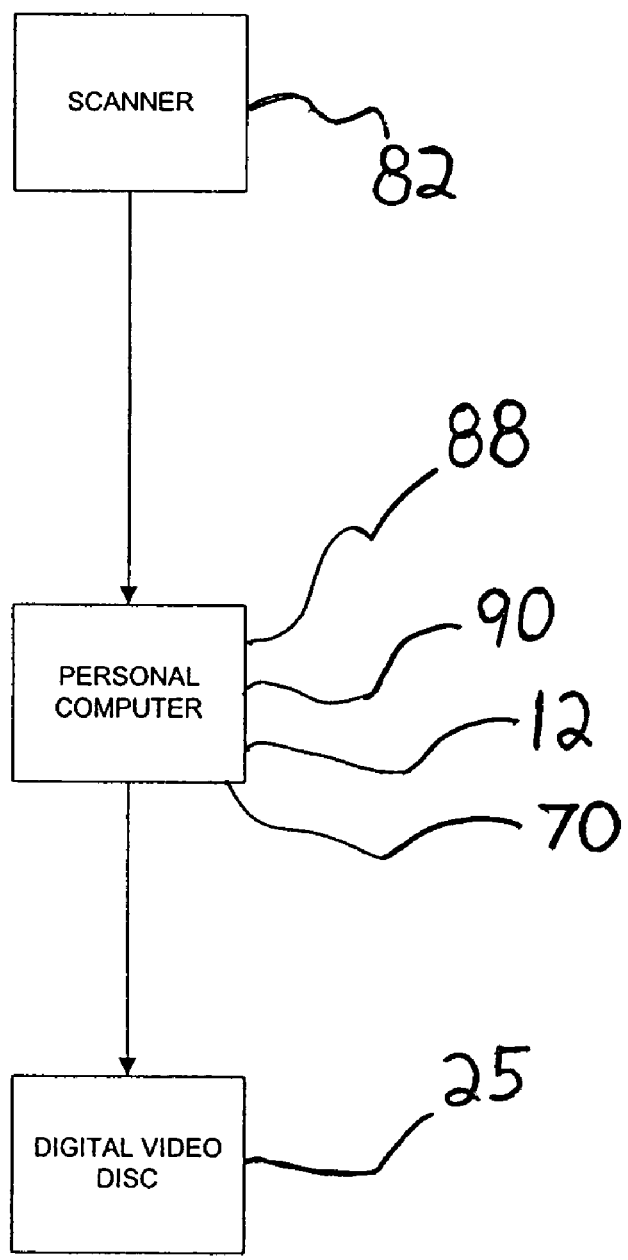
FIG. 16 is a block diagram in accordance with still yet another embodiment of the present invention.

In another application shown in FIG. 15, a user having his own scanner 82 digitally scans his analog photos into digital image data files and stores them into memory 88 in his personal computer 90. From here the user accesses the computer software system 12 through the Internet or other network interface using a web browser. The user alters and stores the image files to the second storage medium as described above. In yet another application depicted in FIG. 16, the user actually installs the computer software system 12 into memory in his personal computer 90. This allows the user to process image files to the digital video disc 25 using his personal computer 90. The user can also have an internal or external media writer 70.

In yet another application, the user interfaces the first storage medium 10 such as a digital image memory card with either his own personal computer or an on-site unit and manipulates and stores the digital images to the digital video disc 25 as described above.

Figure 13:
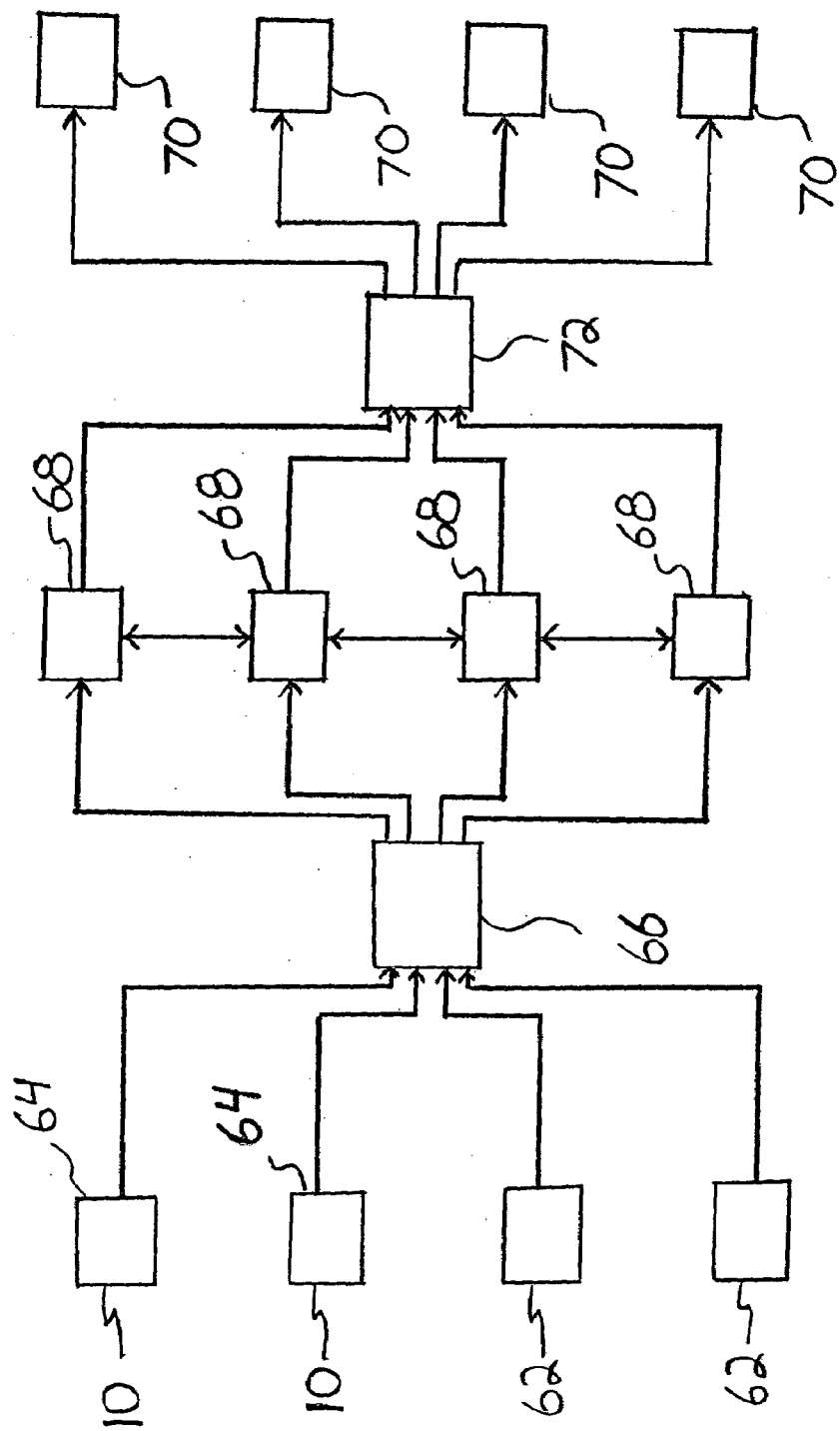
FIG. 13 is a block diagram in accordance with still another preferred embodiment of the present invention.

Referring now to FIG. 13, it is sometimes desirable to process image data to hundreds if not thousands of digital video disc 25 daily in certain applications, such as for drop off facilities. In a drop off facility 92, a user can drop off a roll of film having analog photos either already processed photographs or a first storage medium 10 having digital image files. A scanner 62 digitally scans the analog photographs, while the first storage medium 10 is installed into one of a plurality of interfaces 64. The scanners 62 and interfaces 64 are connected to a plurality of processing units 68 via an input hub 66 such as an Ethernet hub, a universal serial bus or other hub wired or wireless interface.

The processing units 68 efficiently process many digital image files and transfer the image files to a plurality of device drivers 70 through an output hub 72, which is similar to the input hub 66. The device drivers 70 transfer the processed digital image files to a plurality of digital video disc 25, so that many processed digital video discs can be created at once.

In the application depicted in FIG. 13, each of the processing units has access to any data files in the entire facility 92. Therefore, this system uses parallel processing to create many, for example, digital video disks simultaneously.

It should be noted that for all of the described applications, data can be transmitted via wireless or wired means.

Various changes and modifications, other than those described above in the preferred embodiment of the invention described herein will be apparent to those skilled in the art. While the invention has been described with respect to certain preferred embodiments and exemplifications, it is not intended to limit the scope of the invention thereby, but solely by the claims appended hereto.

What is claimed is:

1. An apparatus for creating a digital video disc having user controllabe interactive playback capabilities for still images when played on a standard digital video disc playback device, from at least one compressed digital image file that is stored on a memory card, said at least one compressed digital image file being representative of at least one still image, said apparatus comprising:
   a housing;
   a digital video disc writer secured within said housing that interfaces with said digital video disc;
   a multi card reader secured within said housing that interfaces with said memory card;
   customized computer software processing means stored within said housing,
      wherein said customized computer software processing means includes reading means that reads the at least one compressed digital image file that is stored on the memory card;
      wherein said customized computer software processing means further includes formatting means that formats the read at least one compressed digital image file according to a digital video storage standard; and
   wherein said digital video disc writer further includes writing means that writes the formatted digital image according to the digital video storage standard to the digital video disc.

2. The apparatus of claim 1, wherein said customized computer software processing means further includes menu creation means that creates at least one menu file for user controllable interactive playback.

3. The apparatus of claim 2, wherein said customized computer software processing means further includes menu compression means that compresses said at least one menu file.

4. The apparatus of claim 3, wherein said customized computer software processing means further includes a second formatting means that formats said compressed at least one menu file and said at least one compressed digital image file in compliance with a digital video standard.

5. The apparatus of claim 4, wherein said customized computer software processing means further includes sequencing means that encodes playback sequence control information.

6. The apparatus of claim 1, wherein said customized computer software processing means further includes personal computer operational software and wherein said formatting means formats said personal computer operational software according to the digital video storage standard.

7. The apparatus of claim 1, wherein said housing further includes an user controllable interactive touch screen display.

8. The apparatus of claim 7, wherein said user controllable interactive touch screen display includes input means for inputs selected from the group consisting essentially of a create input and a cancel input.

9. The apparatus of claim 1, wherein said housing includes visual indicators selected from the group consisting essentially of an idle indicator, a ready indicator, a busy indicator and a writing indicator.

10. The apparatus of claim 1, wherein said touch screen display further includes viewing means for viewing at least one image representative of said at least one compressed digital image file.

11. The apparatus of claim 1, wherein each of said customized computer software processing means further includes menu creation means that creates at least one menu file for user controllable interactive playback.

12. The apparatus of claim 11, wherein each of said customized computer software processing means further includes compression means that compresses said at least one menu file.

13. The apparatus of claim 12, wherein said each of said customized computer software processing means further includes second formatting means that formats said compressed at least one menu file and said compressed at least one digital image file in compliance with a digital video standard.

14. The apparatus of claim 13, wherein each of said customized computer software processing means further includes sequencing means that encodes playback sequence control information.

15. An apparatus for creating a digital video disc having user controllable interactive playback capabilities for still images when played on a standard digital video disc playback device, from at least one compressed digital image file representative of at least one still image, said apparatus comprising:
   a first housing;
   a digital video disc writer secured within said first housing;
   a file source having said at least one compressed digital image file;
   customized computer software processing means stored within said first housing,
      wherein said customized computer software processing means includes reading means that reads said at least one compressed digital image file;
      wherein said customized computer software processing means further includes formatting means that formats the read said at least one compressed digital image file according to a digital video storage standard;
   wherein said digital video disc writer further includes writing means that writes the formatted digital image to the digital video disc according to the digital video storage standard; and
   data transmission means that transmits said at least one compressed digital image file to said reading means.

16. The apparatus of claim 15 wherein said file source includes a digital scanner.

17. The apparatus of claim 15 wherein said file source includes a computer having an input storage medium interfaced therewith, wherein said input storage medium contains said at least one compressed digital image file.

18. The apparatus of claim 15, wherein said customized computer software processing means further includes menu creation means that creates at least one menu file for user controllable interactive playback.

19. The apparatus of claim 18, wherein said customized computer software processing means further includes menu compression means that compresses said at least one menu file.

20. The apparatus of claim 19, wherein said customized computer software processing means further includes second formatting means that formats said compressed at least one menu file and said at least one compressed digital image file in compliance with a digital video standard.

21. The apparatus of claim 20, wherein said customized computer software processing means further includes sequencing means that encodes playback sequence control information.

22. The apparatus of claim 15, wherein said customized computer software processing means further includes personal computer operational software and wherein said formatting means formats said personal computer operational software according to the digital video storage standard.

23. The apparatus of claim 15, wherein said file source further includes a multi card reader disposed within a second housing, and further including a memory card interfaced with said multi card reader.

24. The apparatus of claim 15, wherein said first housing includes visual indicators selected from the group consisting essentially of an idle indicator, a ready indicator, a busy indicator and a writing indicator.

25. The apparatus of claim 15, further including viewing means for viewing at least one image representative of said at least one compressed digital image file.

26. An apparatus for simultaneously creating a plurality of digital video discs each of said plurality of video discs having user controllable interactive playback capabilities when played on a standard digital video disc playback device, from a plurality of digital inputs each of said plurality of digital inputs having at least one compressed digital image file, said apparatus comprising:
   a plurality of digital input devices each having at least one compressed digital image file;
   first parallel data transmission means connected from said plurality of digital input devices to an input hub for transmitting said at least one compressed digital image file from each of said plurality of digital input devices;
   second parallel data transmission means connected from said input hub that transmits said compressed digital image files from said input hub to a plurality of parallel processing units, wherein each of said plurality of parallel processing units includes customized computer software processing means,
      wherein said customized computer software processing means includes reading means that reads said at least one compressed digital image file;
      wherein said customized computer software processing means further includes formatting means that formats the read said at least one compressed digital image file according to a digital video storage standard;
   third parallel data transmission means that transmits said formatted digital image files to an output hub; and
   fourth parallel data transmission means that transmits said formatted digital image files from said output hub to a plurality of external digital video disc writers.

27. The apparatus of claim 26, wherein each of said customized computer software processing means further includes personal computer operational software and wherein said formatting means formats said personal computer operational software according to the digital video storage standard.

28. The apparatus of claim 26, wherein said plurality of digital input devices includes at least one multi card reader that reads digital image files from a first storage medium.

29. The apparatus of claim 26, wherein said plurality of digital input devices includes at least one digital scanner.

30. The apparatus of claim 26, wherein said plurality of digital input devices includes a computer having an input storage medium interfaced therewith, wherein said input storage medium contains said at least one compressed digital image file.

31. An apparatus for creating a digital video disc having user controllable interactive playback capabilities of still images when played on a standard digital video disc playback device, said apparatus comprising:
   a storage medium having at least one compressed digital image file representative of at least one still image;
   a first housing having customized computer software processing means stored within said first housing,
      wherein said customized computer software processing means includes reading means that reads the at least one compressed digital image file that is stored on the first storage medium;
      wherein said customized computer software processing means further includes formatting means that formats the read at least one compressed digital image file according to a digital video storage standard; and
   a digital video disc writer that interfaces with said digital video disc, wherein said digital video disc writer further includes writing means that writes the at least one formatted digital image file to the digital video disc according to the digital video storage standard.

32. The apparatus of claim 31, further including a second housing for storing said storage medium, wherein said storage medium is selected from the group consisting essentially of a first storage medium, a digital scanner and a computer having an input storage medium interfaced therewith, and further including a first data transmission means for transmitting said at least one compressed digital image file to said reading means, wherein said first data transmission means is selected from the group consisting essentially of wired means or wireless means.

33. The apparatus of claim 32, wherein said first housing includes said digital video disc writer, and further including a second data transmission means for transmitting said formatted at least one compressed digital image file according to a digital video storage standard to said video disc writer, wherein said second data transmitting means includes an internal bus.

34. The apparatus of claim 32, further including a third housing having said digital video disc writer, and further including a second data transmission means for wherein said transmitting said at least one compressed digital image file to said digital video disc writer, said second data transmitting means is selected from the group consisting essentially of wired means or wireless means.

35. The apparatus of claim 31, wherein said first housing includes said storage medium, and further including a first data transmission means for transmitting said at least one compressed digital image file to said reading means, said first data transmitting means including an internal bus.

36. The apparatus of claim 35, wherein said first housing includes said digital video disc writer, and further including a second data transmission means for transmitting said at least one compressed digital image file to said digital video disc writer, said second data transmitting means including an internal bus.

37. The apparatus of claim 35, further including a second housing having said digital video disc writer, and further including a second data transmission means for wherein said transmitting said at least one compressed digital image file to said digital video disc writer, said second data transmitting means is selected from the group consisting essentially of wired means or wireless means.

38. The apparatus of claim 31, wherein said customized computer software processing means further includes menu creation means that creates at least one menu file for user controllable interactive playback.

39. The apparatus of claim 38, wherein said customized computer software processing means further includes menu compression means that compresses said at least one menu file.

40. The apparatus of claim 39, wherein said customized computer software processing means further includes a second formatting means that formats said compressed at least one menu file and said at least one compressed digital image file in compliance with a digital video standard.

41. The apparatus of claim 40, wherein said customized computer software processing means further includes sequencing means that encodes playback sequence control information.

* * * * *